Patented Aug. 28, 1951

2,566,105

UNITED STATES PATENT OFFICE 2,566,105

METHOD OF MANUFACTURING CARBON DEPOLARIZATION BODIES FOR ATMOSPHERIC OXYGEN ELEMENTS

Karel Zert, Prague, Czechoslovakia, assignor to United Chemical and Metallurgical Works, Prague, Czechoslovakia, a National corporation No Drawing. Application May 29, 1947, Serial No. 751,444. In Germany February 20, 1943

Section 1, Public Law 690, August 8, 1946
Patent expires February 20, 1963

4 Claims. (Cl. 18—54.7)

The use of active carbon for the manufacture of depolarization electrodes for atmospheric oxygen elements is known, the cores acting as the positive electrode being formed from suitable readily powdered active carbon with or without certain additions and binding agents. This moulding and pressing of the cores of suitable mechanical strength, while detracting as little as possible from their diffusion capacity, has hitherto entailed the use of binding agents, more particularly those of a colloidal nature, the body being rendered more durable by a protective wrapping with gauze.

Furthermore, when using powdered activated carbon, it is necessary to keep to a certain size of grain, such as a suitable ratio of coarse and fine grain and grain structure of the powdered carbon, in order to obtain a durable, efficient electrode. Moreover, a certain pressing pressure is required for the production of core bodies which will retain their form, whilst on the other hand, pressing affects the efficiency of the electrode.

The present invention consists in this, that the raw materials for the production of the active carbon are so prepared and moulded that already after the completion of the activating process carbon electrodes which will retain their form and can be used directly as depolarisation bodies result.

In carrying out this process there is thus obtained in conjunction with the activation process an extremely firm electrode body without binding agents, which, owing to the thermal treatment during the activation possesses extraordinarily firm internal binding and consequently good conductivity combined with a favourable pore development. Through this innovation the requirements as regards quality such as those which present themselves in the working up of powdered active carbon and the necessary precautions connected therewith, are eliminated. Electrode bodies produced in this way are, moreover, considerably more efficient as compared with an electrode formed by the usual method from the same, but pulverised carbon, that is to say, it is not possible to obtain by mechanical moulding of the powdered carbon the same effect as that resulting from the natural, intimate binding or building up of the body during the activation.

According to the invention it is possible to produce depolarisation bodies in a variety of forms, such as are required for batteries, for instance those of pocket torches, and as element bodies for weak current and other current supply purposes.

The suitable plastic nature of the initial material, such as is used for the activation, renders practicable the production of depolarisation bodies in the form of plates, solid cylindrical bodies or those having a central channel. In view of the strength it is possible to obtain with this new process for the activated body, even hollow cylinders of greater diameter can be made, for instance in the form of a beaker with or without a bottom, which beaker forms the outer part of the element and in which the zinc electrode is inserted centrally. In this arrangement the access of the atmospheric oxygen necessary for the depolarisation of the electrode is rendered particularly easy, as the outer carbon electrode has a greater surface and is in direct contact with the air.

The procedure in the manufacture of the depolarisation bodies is as follows. The raw materials required for the production of the active carbon are first prepared in such a manner that from them bodies which will retain their shape can be moulded by pressing. These bodies are thereupon subjected to the activating process usually adopted in the production of element carbon, that is to say, the object aimed at is to obtain a body which, while of firm structure, will be of as good conductivity as possible and have an effective diffusion capacity.

Such a production of depolarisation bodies can be carried out for instance as laid down in Czechoslovakian Patent No. 67532, according to which a mass composed of carbon-containing substances, such as sawdust, peat, charcoal and the like, and of a liquid activating medium, such as zinc chloride solution or phosphoric acid, is kneaded, preferably at 80° to 85° C., and converted into a plastic state. Thereupon, from the plastic mass there is extruded from an extrusion press a ribbon which is cut up into suitable pieces and finished off, or single cores or bodies are made in a press. The durable bodies thus formed are further operated on in the usual way and activated, namely dried, annealed and washed.

The activated bodies are again subjected, in order to improve their catalytic efficiency, and conductivity, to an annealing process at a higher temperature, 800 to 1000° C., whereby at the same time a further consolidation of the substance is brought about. If the annealing process is carried out in the presence of acids, for instance hydrochloric acid, or ammonium salts, such as ammonium chloride, ammonium nitrate, and similar volatile, acid splitting off salts, with which the bodies have been previously saturated, this is of advantage for the efficiency of the carbon.

For the production of the depolarisation bodies a steam or gas activation may with advantage also be employed, in which the element bodies are formed from charcoal, lignite, peat and the like with the addition of a suitable binding agent, such as tar, are annealed and subjected to the gas activation.

For obtaining a good air circulation the bodies may with advantage be provided already during the moulding operation with circulation channels extending right through them. For enlarging the external superficial area, it may be given a corrugated form, also during the pressing stage.

I claim:

1. The method of manufacturing solid depolarization electrodes for atmospheric oxygen elements which comprises mixing carbonaceous material essentially consisting of substances of vegetable origin with an aqueous carbon activating agent selected from the group consisting of zinc chloride solutions and phosphoric acid, kneading the mixture at 80 to 85° C. until it is converted into a plastic state, pressing the resulting plastic material into a body of a shape usable as a depolarization electrode, drying the electrode body, activating the carbon in said body by heating, washing out the activating agent from the activated body, redrying the washed electrode body and thereafter subjecting the dry body to a step which consists of heating the electrode body at 800 to 1000° C. in order to make it electrically conductive.

2. A method according to claim 1 wherein the carbon activating agent is zinc chloride.

3. A method according to claim 1, wherein the washed activated electrode body is impregnated with a volatile acid yielding inorganic material prior to the high temperature annealing step.

4. A method according to claim 3 wherein the acid yielding material is aqueous ammonium chloride.

KAREL ZERT.

REFERENCES CITED

The following references are of record in the file of this patent:

UNITED STATES PATENTS

| Number | Name | Date |
|--------|------|------|
| 431,968 | Goodwin | July 8, 1890 |
| 1,497,544 | Chaney | June 10, 1924 |
| 1,902,986 | Barker | Mar. 28, 1933 |

FOREIGN PATENTS

| Number | Country | Date |
|--------|---------|------|
| 446,385 | Great Britain | Apr. 29, 1936 |